United States Patent [19]

Blanchard et al.

[11] Patent Number: 4,680,282

[45] Date of Patent: Jul. 14, 1987

[54] POLLUTION CONTROL CATALYST FOR INTERNAL COMBUSTION ENGINE EXHAUST GASES AND PROCESS FOR PRODUCING IT

[75] Inventors: Gilbert Blanchard, Le Plessis-Belleville; Michel Prigent, Rueil Malmaison, both of France

[73] Assignee: Pro-Catalyse, Rueil Malmaison, France

[21] Appl. No.: 760,575

[22] Filed: Jul. 30, 1985

[30] Foreign Application Priority Data

Jul. 30, 1984 [FR] France ................................. 84 12047

[51] Int. Cl.$^4$ ........................ B01J 21/06; B01J 23/10; B01J 23/44; B01J 23/46
[52] U.S. Cl. .................................. 502/304; 423/213.5
[58] Field of Search ...................... 502/304; 423/213.5

[56] References Cited

U.S. PATENT DOCUMENTS

| | | | |
|---|---|---|---|
| 4,294,726 | 10/1981 | Bozon et al. ......................... | 502/304 |
| 4,299,734 | 11/1981 | Fujitani et al. ...................... | 502/304 |
| 4,367,162 | 1/1983 | Fujitani et al. ................. | 502/304 X |
| 4,426,319 | 1/1984 | Blanchard et al. ............. | 502/304 X |
| 4,504,598 | 3/1985 | Ono et al. ........................ | 502/304 X |
| 4,581,343 | 4/1986 | Blanchard et al. ............. | 502/304 X |

*Primary Examiner*—W. J. Shine
*Attorney, Agent, or Firm*—Burns, Doane, Swecker & Mathis

[57] ABSTRACT

A multifunctional pollution control catalyst for the treatment of exhaust gases from internal combustion engines is comprised of a catalyst support having an active catalytic phase deposited thereon, said active catalytic phase comprising catalytically effective amounts of (i) zirconium, (ii) cerium, (iii) palladium, (iv) iridium and/or rhodium, and, optionally, (v) iron.

23 Claims, No Drawings

POLLUTION CONTROL CATALYST FOR INTERNAL COMBUSTION ENGINE EXHAUST GASES AND PROCESS FOR PRODUCING IT

BACKGROUND OF THE INVENTION

1. Field of the Invention:

The present invention relates to multifunctional catalysts and, more especially, to multifunctional catalysts useful in catalytic converters for the treatment of the exhaust gases from internal combustion engines.

Consistent with this invention, by the expression "multifunctional catalysts" are intended catalysts which promote oxidation, in particular, of the carbon monoxide and the hydrocarbons present in the internal combustion engine exhaust gases, and also the simultaneous reduction, in particular, of the nitrogen oxides present in such gases.

2. Description of the Prior art:

In gasoline fueled internal combustion engines, the composition of the exhaust gases may be adjusted to attain a stoichiometric equilibrium such that the catalytic reduction and oxidation of its various constituents produce water, carbon dioxide and nitrogen. The methods generally used for adjusting the composition of the exhaust gas in order to achieve this stoichiometry include, in particular, the continuous adjustment of the air/fuel ratio at the engine intake and/or the introduction of additional oxygen upstream of the catalyst. The composition of the exhaust gas can thus be varied over periods on the order of one second from a composition containing a relative excess of oxidizing compounds (referred to as a "lean" setting) to a composition containing an excess of reducing compounds (referred to as a "rich" setting), and vice versa.

In particular, the setting referred to as "lean" is such that the amounts of oxygen and nitrogen oxide present are greater than those required to oxidize the carbon monoxide, the hydrocarbons and the hydrogen which are present. Conversely, and in particular the setting referred to as "rich" is such that the amounts of carbon monoxide, hydrocarbons and hydrogen which are present are greater than those required to reduce the oxygen and nitrogen oxides which are present.

Catalysts for the pollution control treatment of such exhaust gases are, of course, known to this art.

Thus, European Pat. No. 27,069 assigned to the assignee hereof describes a catalyst incorporating a support based on a refractory oxide and an active phase consisting of cerium, iron, at least one metal selected from between platinum and palladium and at least one metal selected from between iridium and rhodium.

Published German Application No. 2,449,475 features multifunctional catalysts having cerium, iron, zirconium, rhodium and platinum as an active phase.

And published German Application No. 3,223,500 features multifunctional catalysts having rhodium, palladium, iron and cerium as an active phase.

However, such catalysts are found to have a stability over time which is insufficient to satisfy the present antipollution requirements.

SUMMARY OF THE INVENTION

Accordingly, a major object of the present invention is the provision of novel and improved multifunctional catalysts based on zirconium, cerium, palladium and rhodium/iridium, which novel pollution control catalysts are not only conspicuously devoid of those disadvantages and drawbacks to date characterizing the state of this art, but also, quite surprisingly and unexpectedly, are both highly active and remarkably stable over time.

Briefly, the present invention features a multifunctional catalyst characterized in that it incorporates a support onto which there is deposited, by impregnation, an active phase of zirconium and cerium and, if appropriate, iron, palladium and at least one of the metals iridium and rhodium.

DETAILED DESCRIPTION OF THE INVENTION

More particularly according to the present invention, the support which is used is advantageously in particulate form, and even more advantageously is based on alumina.

In a preferred embodiment of the invention, a support based on alumina particulates is used, such particulates preferably having a specific surface ranging from 25 to 250 $m^2/g$, and more preferably ranging from 70 to 150 $m^2/g$. It preferably has a total pore volume ranging from 0.5 to 2 $cm^3/g$, and more preferably from 0.8 to 1.7 $cm^3/g$. Preferably, it has a macroporosity such that the pore volume of the pores with a diameter greater than 1000Å ranges from about 0.05 to 0.6 $cm^3/g$, and more preferably from 0.2 to 0.5 $cm^3/g$.

Such supports can readily be manufactured from the active alumina obtained in accordance with the process described in U.S. Pat. No. 2,915,365 and agglomerated according to the process described in U.S. Pat. No. 2,881,051.

The supports can also be manufactured by autoclaving the aforementioned agglomerates in a neutral or acidic medium, and then drying and calcining same, particularly as described in French Pat. Nos. 1,449,904 and 1,386,364.

The alumina supports may also be manufactured according to the process described in French Patent Application No. 77/23880, published under No. 2,399,276.

The alumina supports employed may also be manufactured according to the process described in published European Patent Application No. 15,801 assigned to Rhone-Poulenc Industries.

In general, the supports based on alumina particles which are employed according to the invention may have been treated, in a manner well known to this art, with porogenic agents such as those based on cellulose, naphthalene, natural gums, synthetic polymers, and the like, in order to achieve the desired porosity.

The support employed may also comprise one or more oxides coating a metal or ceramic substrate, with the substrate preferably being in the form of an inert and rigid structure of monolithic type containing channels or conduits, e.g., a honeycomb. Such supports are well known to this art and have been extensively described in the literature, with the oxides employed preferably being in the form of a film or a coating applied to the substrate.

The oxides which constitute the coating are, most commonly, based on aluminum oxide.

The metal substrates are advantageously those produced from alloys of iron, nickel, or chromium, or those produced from iron, chromium, aluminum and cobalt, such as those marketed under the trademark Kanthal, or those produced from alloys of iron, chromium, aluminum and yttrium and marketed under the trademark Fecralloy. The metal may also be carbon steel or ordinary cast iron.

The aluminum-based metal substrates may advantageously be pretreated by heating same in an oxidizing atmosphere under conditions of time and temperature sufficient to form a surface layer of aluminum oxide from the aluminum present in the alloy. In the case of carbon steels or cast iron, metal substrates thereof can also be pretreated by reheating the steel or iron coated with a layer of aluminum to produce a coating of an aluminum/iron diffusion layer.

The ceramic substrates which may be used are preferably those comprised of one of the following materials as the major component: cordierite, alumina, mullite, porcelain, and boron or silicon carbides.

In a preferred embodiment of the invention, the aluminum oxide coating on these ceramic or metal substrates is achieved by application of alumina hydrate thereto, followed by calcination, or by deposition of an aluminum salt onto the substrate, followed by calcination, or by application of a layer of active alumina followed by calcination.

The cellular structure may be hexagonal, tetragonal, triangular or undulating in shape; it must permit the passage of gas through the channels or conduits which are formed during its manufacture by a process of extrusion, rolling, solidifying of components in the form of a sheet, or the like.

Furthermore, the supports employed according to the invention are advantageously treated such as to provide them with good thermal stability over time. The stabilized supports described in French Pat. Nos. 2,257,335 and 2,290,950 are suitable for the purposes of this invention.

The palladium content of the subject catalysts advantageously ranges from about 0.04 to 3% by weight relative to the final catalyst and, preferably, from about 0.05 to 0.50% by weight. That of the metal selected from iridium and rhodium advantageously ranges from about 0.002 to 0.3% by weight, and preferably from about 0.005 to 0.1% by weight.

In a particular embodiment of the invention, catalysts comprised of rhodium in association with palladium are used.

The total amount of cerium in the active phase of the catalysts according to the invention ranges from about 0.1 to 10% by weight relative to the final catalyst. This amount preferably ranges from 0.3 to 5.0%.

The amount of zirconium in the active phase of the catalysts according to the invention ranges from about 0.1 to about 10% by weight relative to the final catalyst. This amount preferably ranges from 0.1 to 6%.

In another embodiment of the invention, the catalysts may additionally incorporate at least one of the following metals: iron, tungsten, nickel, manganese, tin, germanium, cobalt, uranium and rhenium. The total amount by weight of these additional metals which are added to the support ranges from about 0.2 and 5%.

The catalysts according to the invention can be prepared in accordance with conventional methods, preferably by impregnation of the support with a solution of inorganic or organic compounds of the metals sought to be introduced. The impregnation can be carried out using solutions containing all of the various metals sought to be introduced, or successively using different solutions.

In a preferred embodiment, the support is successively impregnated with a solution containing compounds of cerium, zirconium and, if appropriate, iron, and then with one or more solutions containing compounds of palladium and rhodium which it is intended to introduce.

Illustrative of suitable compounds of cerium, zirconium and iron, particularly representative are the salts of cerium, zirconium and iron, and more particularly cerous nitrate, cerous acetate, cerous chloride, ceric ammonium nitrate, zirconyl nitrate, zirconium tetrachloride, ferric nitrate, iron ammonium nitrate and ferric chloride.

Illustrative of suitable compounds of rhodium and palladium which can be used to prepare the catalysts of the invention, particularly representative are rhodium trichloride hydrate, palladium chloride, palladium nitrate, as well as chloropentamminerhodium(III) dichloride and tetramminepalladium(III) dichloride.

When a support based on a refractory oxide and in particular aluminum oxide is used, the depth of impregnation can advantageously be regulated by employing conventional methods which are well known to this art and in particular by the addition of a quantity of an inorganic or organic acid to the solution of the precious metals. Nitric, hydrochloric anc hydrofluoric acids, or acetic, citric and oxalic acids, are typically employed.

After impregnation of the support, the catalyst is next dried and then activated in a stream of air for several hours at a temperature ranging from about 300 to 800° C.

When a support is used consisting in particular of an alumina coating deposited onto a metal or ceramic substrate, the operation is advantageously carried out by contacting the substrate with an aqueous dispersion of an alumina precursor which additionally contains salts or oxides of cerium, zirconium and, if appropriate, iron, and the mixture is next dried and then calcined at about 300°–700° C. These operations are repeated, if appropriate, and then the precious metals are added and the procedure is completed in the same manner as described above in the case of the supports based on refractory oxide particles.

It has surprisingly been found that the catalysts of the present invention can be used to most effectively remove, very efficiently, the major fraction of the carbon monoxide, the unburned hydrocarbons and the nitrogen oxides present in the exhaust gases from internal combustion engines and that, furthermore, they display a remarkable stability over time.

This remarkable stability of the catalysts of the invention over time may be measured by the amount of carbon monoxide which is chemisorbed on the catalysts after aging for 100 hours at a high temperature, for example, 850° C. Thus, the catalysts of the invention are found, wholly unexpectedly, to have a very high adsorption capacity for carbon monoxide. Consistent with the invention, a catalyst which strongly adsorbs carbon monoxide is to be understood as a catalyst aged for 100 hours at 850° C., for which the volume of adsorbed carbon monoxide represents at least 60% of the theoretical volume of carbon monoxide calculated from the relationship:

$$V \text{ (theory)} = 11{,}200 \times N, \text{ in cm}^3 \text{ at NTP,}$$

with N as the number of gram-atoms of platinum, rhodium and palladium present in the specimen employed to measure carbon monoxide adsorption, which contains:

P 1 g of platinum, P 2 g of rhodium and P 3 g of palladium $$N = \frac{P1}{195,09} + \frac{P2}{102,905} + \frac{P3}{106,40}$$

(the CO chemisorption test is described below in Example 7).

In order to further illustrate the present invention and the advantages thereof, the following specific examples are given, it being understood that same are intended only as illustrative and in nowise limitative.

EXAMPLE 1

Preparation of a Catalyst (A) of the Prior Art

A binder and an alumina filler were prepared according to the process described in published European Patent Application No. 73,703.

An alumina binder (I) was prepared as follows: 5,000 g of alumina obtained by hydration of hydrargillite for 0.5 second in a stream of hot gas at 800° C., were introduced into an autoclave containing a solution of nitric acid at a pH of 1. The suspension was heated under agitation for 4 hours at 180° C. The suspension obtained, which formed the alumina binder (I), was spray-dried at 150° C. to convert it into powder form; when examined using X-rays, this powder had a fibrillar boehmite structure.

A portion of this powder was calcined for 2 hours in air at 600° C. to produce the alumina filler (I).

200 g of alumina binder (I) in powder form were dispersed in 2,000 cm³ of distilled water, and stirred for 10 minutes and then 800 g of alumina filler (I) were added, and stirring was continued for 10 minutes. The viscosity of the suspension produced was 25 centipoises. This suspension was employed to coat a 1.98-liter monolithic ceramic structure marketed by Corning, containing 400 cells per square inch, the 1.98-liter monolith was immersed in the suspension at a pH of 3.4, containing 30% by weight of alumina.

The aforementioned support was drained and dried to empty the channels, and was then calcined for 3 hours at 600° C. The monolith coated in this manner was immersed for 30 minutes in an aqueous solution of cerium nitrate and was then drained and dried at 150° C. and calcined for 3 hours at 700° C. The concentration of cerium nitrate in the solution was such that, after immersion and calcination, the monolith contained 8.0% of cerium by weight.

The substrate was then impregnated by soaking in an aqueous solution of palladium nitrate and of rhodium trichloride hydrate.

The concentration of palladium nitrate and rhodium trichloride was such that the monolith was impregnated with 2.0 g of palladium and 0.10 g of rhodium. After 30 minutes of contact, the monolith was dried at 150° C. and then activated for 3 hours at 500° C. in a calcining furnace.

The catalyst (A) prepared in this manner contained 0.200% of palladium, 0.10% of rhodium and 8% of cerium, by weight relative to the monolith catalyst.

EXAMPLE 2

Preparation of a Catalyst (B) of the Prior Art

An alumina binder (II) was prepared in accordance with the process described in published European Patent Application No. 15,801.

An alumina gel cake was produced by continuous precipitation from a solution of sodium aluminate by a solution of nitric acid. The salt cake was drained, filtered, washed and then treated for 24 hours at 115° C. in an agitated autoclave. The product obtained was in the form of a paste containing 12% of alumina, calculated as $Al_2O_3$. The electron photomicrograph of this product evidenced that it consisted of wholly fibrillar ultrafine boehmite consisting of single crystals 500 to 1,000Å in size. The paste, which contained 12% of alumina, was spray-dried at 250° C. in order to convert it into alumina binder in powder form.

An alumina filler (II) was prepared as follows: 900 g of gamma-structure alumina beads were prepared, in accordance with the procedures described in French Pat. Nos. 1,449,904 and 1,386,364, by autoclaving agglomerates of active alumina in the presence of acid, and then by drying and calcining. These alumina beads obtained had a specific surface of 100 m²/g, a total pore volume of 0.90 cm³/g and a volume of 0.40 cm³/g formed by macropores having a diameter greater than 1000Å. These beads were impregnated with 800 cm³ of an aqueous solution of ferric nitrate containing 70 g of iron.

After 30 minutes of contact, the beads were dried at 150° C. and then calcined for 3 hours in air at 700° C.

They were then ground for one hour in a ball mill.

The properties of the alumina filler (II) obtained were as follows:

(i) dispersion ratio: 5%
(ii) particle size distribution: the particle mean diameter was 7 microns.

100 g of alumina binder (II) in powder form were dispersed in 2000 cm³ of distilled water, stirred for 10 minutes and then 900 g of alumina filler (II) were added and stirring was continued for 10 minutes. The viscosity of the suspension produced was 30 centipoises.

This suspension was used to coat a 1.2-liter metal monolith structure made from the metal sheet marketed under the trademark Fecralloy. The monolith was immersed in the suspension at a pH of 3.5 and was then drained, blown and dried to empty the channels, and it was then calcined for 3 hours at 500° C. The substrate was then impregnated by soaking in an aqueous solution of palladium nitrate and rhodium trichloride hydrate, the concentrations of which were such that the monolith was impregnated with 3.0 g of palladium and 0.3 g of rhodium. After 30 minutes of contact, the monolith was drained, blown and dried at 150° C. and then activated for 3 hours at 500° C. in a calcining furnace. The catalyst (B) prepared in this manner contained 0.200% of palladium, 0.020% of rhodium and 3.5% of iron by weight, relative to the monolith catalyst, which were impregnated in the alumina coating.

EXAMPLE 3

Preparation of a Catalyst (C) of the Prior Art 100 g of alumina beads were prepared in accordance with the process described in published French Patent Application No. 79/04,810.

These beads had a specific surface of 100 m²/g, a total pore volume of 1.20 cm³/g and a volume of 0.45 cm³/g formed by macropores having a diameter greater than 1000Å.

These beads were impregnated with 120 cm³ of an aqueous solution of cerous nitrate, zirconyl nitrate and ferric nitrate, containing 2.0 g of cerium, 3.5 g of zirconium and 1.0 g of iron.

After 30 minutes of contact, the beads were dried at 150° C. and then calcined for 3 hours in air at 700° C.

They were then impregnated with 110 cm³ of a solution of hexachloroplatinic acid and rhodium trichloride hydrate containing 200 mg of platinum and 10 mg of rhodium.

After 30 minutes of contact, the beads were dried at 150° C. and then calcined for 3 hours at 500° C. in a stream of air circulating at 200 liters per hour.

The catalyst (C) prepared in this manner contained 0.200% of platinum, 0.010% of rhodium, 2.0% of cerium, 3.5% of zirconium and 1% of iron by weight, relative to the support.

EXAMPLE 4

Preparation of a Catalyst (D) According to the Invention

A suspension of alumina as described in Example 1 was prepared.

This suspension was employed to coat a ceramic structure as in Example 1.

The monolith coated as in Example 1 was immersed in an aqueous solution of cerium nitrate and zirconium nitrate, the concentrations of which were such that, after immersion and calcining, the monolith contained 2.5% by weight of cerium and 5.5% by weight of zirconium.

The substrate was then impregnated and calcined as in Example 1.

The catalyst (D) prepared in this manner contained 0.20% of palladium, 0.010% of rhodium, 2.5% of cerium and 5.5% of zirconium by weight, relative to the monolith catalyst.

EXAMPLE 5

Preparation of a Catalyst (E) According to the Invention

A alumina binder (II) as described in Example 2 was prepared.

An alumina filler (III) was prepared as described in Example 2 by impregnating 300 g of alumina beads with 800 cm³ of an aqueous solution of ferric nitrate, cerous nitrate and zirconyl nitrate containing 30 g of iron, 70 g of cerium and 70 g of zirconium.

A 1.2-liter metal monolith structure was coated with the suspension of alumina binder (I) and of alumina filler (III) as described in Example 2. The substrate was then impregnated and calcined as in Example 2.

The catalyst (E) prepared in this manner contained 0.200% of palladium, 0.020% of rhodium, 1.5% of iron, 3.5% of cerium and 3.5% of zirconium by weight, relative to the monolith catalyst, which were impregnated in the alumina coating.

EXAMPLE 6

Preparation of a Catalyst (F) According to the Invention 100 g of alumina beads were impregnated, as described in Example 3, with an aqueous solution of cerous nitrate, zirconyl nitrate and ferric nitrate containing 2.0 g of cerium, 3.5 g of zirconium and 1.0 g of iron.

After 30 minutes of contact, the beads were dried at 150° C. and then calcined for 3 hours in air at 750° C.

They were then impregnated with 110 cm³ of a solution of palladium nitrate and rhodium trichloride hydrate containing 320 mg of palladium and 16 mg of rhodium.

After 30 minutes of contact, the beads were dried at 150° C. and then activated for 3 hours at 500° C. in a stream of air circulating at 200 liters per hour.

The catalyst (F) prepared in this manner contained 0.320% of palladium, 0.016% of rhodium, 2.0% of cerium, 3.5% of zirconium and 1.0% of iron by weight, relative to the support.

EXAMPLE 7

Chemisorption of Carbon Monoxide on the Various Catalysts Aged at High Temperature This example reports the results obtained for chemisorption of carbon monoxide with the various catalysts (A), (B), (C), (D), (E) and (F) described, respectively, in Examples 1, 2, 3, 4, 5 and 6.

(1) The conditions of the carbon monoxide chemisorption test were as follows:

A 10-cm³ sample of the catalyst was first reduced at 350° C. in a stream of hydrogen. The hydrogen adsorbed on the catalyst was removed by being purged with a stream of high-purity argon at the same temperature. The solid obtained in this manner was returned to ambient temperature, continually purged with high-purity argon. Known volumes of carbon monoxide were introduced into the argon stream (1.8 l/h), upstream of the catalyst.

Since chemisorption takes place under dynamic conditions, a thermal conductivity measuring cell was employed to determine the change in the residual amount of carbon monoxide in the carrier gas. The CO peak area obtained was proportional to the amount of CO which remained in the gaseous effluent. Successive injections of CO were continued until peaks having the same area were obtained. This area, which corresponded to the volume of CO introduced at each injection was taken as the reference.

If n is the number of injections before "constant area" peaks were obtained

V—the volume injected each time in cm³

$S_i$—the area of the i-th injection

S—the area of the invariant peak the amount of CO fixed by the catalyst was, in cm³:

$$\frac{nS - \sum_{1}^{n} S_i}{s} \times V\,(NTP)$$

the injected volume, adjusted to normal temperature and pressure tions (NTP) was:

$$V(TPN) = \frac{VT° \times 760 \times 273}{P \times (273 + T°)}$$

where P=pressure, in mm of mercury and T°=temperature of adsorbed carbon monoxide in ° C.

(2) Conditions for aging the catalysts (A), (B), (C), (D), (E) and (F) described, respectively, in Examples 1 to 6.

The procedure employed consisted of heating the catalysts for 100 hours at 850° C. under a stream of a mixture consisting of 90% of nitrogen and 10% of water. The procedure was used to simulate the sintering of the metal phase of the catalysts tested for endurance for 600 hours on an engine bench when the aging cycle included a 10-minute plateau at 850° C. per 1-hour cycle such as that described in Example 8.

(3) Results obtained with the catalysts (A), (B), (C), (D), (E) and (F) for the chemisorption of carbon monoxide:

TABLE I

| Example No. | Catalyst reference | CO chemisorbed* | V theory cm³ NTP | V chemisorbed / V theory (in %) |
|---|---|---|---|---|
| | | Prior art | | |
| 1 | A | 0.31 | 1.12 | 27.7 |
| 2 | B | 0.66 | 2.90 | 22.8 |
| 3 | C | 0.12 | 0.628 | 19.1 |
| | | Invention | | |
| 4 | D | 0.86 | 1.12 | 76.8 |
| 5 | E | 2.11 | 2.90 | 72.7 |
| 6 | F | 1.18 | 1.77 | 66.6 |

*Amount of carbon monoxide chemisorbed by the catalyst, measured under NTP conditions, in cm³/10 cm³, of catalyst.

It will be seen that the amount of carbon monoxide chemisorbed by the catalysts prepared according to the invention was, in all cases, greater than that for the catalysts prepared according to the prior art, which means that the accessibility of the palladium particles in the catalysts according to the invention, calcined at a high temperature, was, in all cases, greater than the accessibility of the palladium or platinum particles in the catalysts of the prior art, aged under the same conditions.

EXAMPLE 8

Endurance Behavior of the Catalysts (A), (B), (C), (D), (E) and (F) for Simultaneous Removal of Carbon Monoxide, Hydrocarbons and Nitrogen Oxides from the Exhaust Gases of an Engine Operating at Richness 1 on a Test Bench The engine employed for these tests was a Renault 18 USA-type engine with a cylinder displacement of 1647 cm³, equipped with a BOSCH L-JETRONIC gasoline injection feed, regulated at richness 1 by virtue of an oxygen probe located at the outlet of the exhaust manifold.

The fuel consumed by the engine in these trials was lead-free gasoline containing, however, a residual lead concentration adjusted in all cases to 0.013 g/liter.

With the engine coupled to a dynamometer brake, the speed of rotation and the load imposed on the engine were adjusted such that the aging cycle consisted of two successive sequences:

(i) a first phase of 10 minutes with an exhaust gas flow rate of 180 Nm³/h and a catalyst pot inlet temperature of 850°±10° C.;

(ii) a second phase of 50 minutes with an exhaust gas flow rate of 85 Nm³/h and a catalyst pot inlet temperature of 475°±10° C.

Catalyst performances were determined after 35 minutes of stabilization in the second phase at 475°±10° C.

For testing catalysts in bead form, an experimental catalytic converter of the radial circulation type, 1700 cm³ in volume, constructed in accordance with the principle described in French Pat. No. 74/06,395 was fitted into the exhaust line at a distance of approximately 1.20 m from the engine. The catalysts on monoliths were mounted in welded metal casings fitted into the exhaust line at a distance of approximately 0.80 m from the engine.

Measurement of the degree of removal of each of the three pollutants was carried out at regular intervals at 475°±10° C. by analysis of the gases upstream and downstream of the catalytic converters.

Table II below reports the results obtained at the beginning of the test and after 600 hours of running.

It will be seen that the stability of the activity of the catalysts prepared according to the invention was markedly improved in relation to that of the catalysts prepared according to the prior art.

TABLE II

| | Example No. | Catalyst reference | Initial purification (in %) | | | Purification after 600 h (in %) | | |
|---|---|---|---|---|---|---|---|---|
| | | | CO | HC | $NO_x$ | CO | HC | $NO_x$ |
| Prior art | 1 | A | 97.3 | 95.1 | 91.0 | 87.4 | 80.7 | 79.5 |
| | 2 | B | 97.7 | 96.5 | 93.0 | 88.0 | 81.0 | 84.5 |
| | 3 | C | 98.5 | 97.3 | 91.8 | 84.0 | 75.5 | 80.2 |
| Invention | 4 | D | 96.5 | 95.5 | 89.0 | 94.5 | 90.1 | 86.5 |
| | 5 | E | 97.1 | 96.3 | 93.2 | 90.7 | 87.8 | 89.9 |
| | 6 | F | 98.0 | 98.1 | 94.5 | 93.2 | 90.5 | 87.7 |

While this invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A catalyst adapted for the treatment of internal combustion engine exhaust gases, which comprises (1) a support having (2) an active catalytic phase deposited thereon, said active catalytic phase comprising catalytically effective amounts of (i) zirconium, (ii) cerium, (iii) palladium, and (iv) at least one of the metals iridium and rhodium, said catalyst being produced by a process comprising (i) coating said support with a mixture of an alumina binder and an alumina filler, (ii) drying and calcinating said coated support, (iii) depositing cerium and zirconium on the support resulting from step (ii), (iv) drying and calcinating the support, (v) depositing palladium and iridium and/or rhodium on the carrier resulting from step (iv), and (vi) drying and calcinating the deposited carrier.

2. The catalyst of claim 1, said active catalytic phase further comprising a catalytically effective amount of iron added during step (iii).

3. The catalyst of claim 1 or 2, comprising from about 0.04 to 3% by weight of palladium.

4. The catalyst of claim 3, comprising from about 0.05 to 0.50% by weight of palladium.

5. The catalyst of claim 3, comprising from about 0.002 to 0.3% by weight of iridium and/or rhodium.

6. The catalyst of claim 5, comprising from about 0.005 to 0.1% by weight of iridium and/or rhodium.

7. The catalyst of claim 5, comprising from about 0.1 to 10% by weight of cerium.

8. The catalyst of claim 7, comprising from about 0.3 to 5.0% by weight of cerium.

9. The catalyst of claim 7, comprising from about 0.1 to 10% by weight of zirconium.

10. The catalyst of claim 9, comprising from about 0.1 to 6% by weight of zirconium.

11. The catalyst of claim 1 or 2, wherein said active catalytic phase (2) is impregnated onto said support (1).

12. The catalyst of claim 1 or 2, said support (1) comprising a refractory oxide.

13. The catalyst of claim 12, said support (1) comprising alumina particulates.

14. The catalyst of claim 13, said alumina particulates having a specific surface area ranging from 25 to 250 m$^2$/g, a total pore volume ranging from 0.5 to 2 cm$^3$/g, and a macroporosity such that the pore volume of pores having a diameter greater than 1000 A ranges from 0.05 to 0.6 cm$^3$/g.

15. The catalyst of claim 14, said specific surface area ranging from 70 to 150 m$^2$/g, said total pore volume ranging from 0.8 to 1.7 cm$^3$/g, and said macroporosity ranging from 0.2 to 0.5 cm$^3$/h.

16. The catalyst of claim 1 or 2, said support (1) comprising a metal or ceramic substrate coated with a refractory oxide.

17. The catalyst of claim 16, said refractory oxide comprising aluminum oxide.

18. The catalyst of claim 16, said substrate comprising an open network monolith.

19. The catalyst of claims 1 or 2, adapted to absorb at least 60% of the theoretical amount of carbon monoxide after aging for 100 hours at 850° C.

20. The catalyst of claims 1 or 2, said active catalytic phase comprising both palladium and rhodium.

21. A process for producing a catalyst comprising (i) providing a support, (ii) coating said support with a mixture of an alumina binder and an alumina filler, (iii) drying and calcining said coated support, (iv) depositing cerium and zirconium on the support resulting from step (iii), (v) drying and calcining the deposited support, (vi) depositing palladium and iridium and/or rhodium on the support resulting from step (v), and (vii) drying and calcining the deposited support.

22. The process of claim 21, further comprising depositing during step (iv) a catalytically effective amount of iron.

23. The process of claim 21, wherein said depositing steps comprise impregnation onto said support.

* * * * *